United States Patent
Jensen et al.

(10) Patent No.: US 11,654,856 B2
(45) Date of Patent: May 23, 2023

(54) INFLATOR BRACKET ABSORPTION FEATURE

(71) Applicant: Ford Global Technologies, LLC, Dearborn, MI (US)

(72) Inventors: John W. Jensen, Canton, MI (US); Christopher Robert Tilli, Brighton, MI (US); Christopher Donald Schop, Chelsea, MI (US); Chuck R. Reese, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/479,163

(22) Filed: Sep. 20, 2021

(65) Prior Publication Data

US 2023/0090937 A1   Mar. 23, 2023

(51) Int. Cl.
| | |
|---|---|
| *B60R 21/213* | (2011.01) |
| *B60R 21/217* | (2011.01) |
| *B60R 21/232* | (2011.01) |
| *B60R 21/214* | (2011.01) |

(52) U.S. Cl.
CPC .......... *B60R 21/213* (2013.01); *B60R 21/214* (2013.01); *B60R 21/2171* (2013.01); *B60R 21/232* (2013.01)

(58) Field of Classification Search
CPC ... B60R 21/213; B60R 21/214; B60R 21/217; B60R 21/2171; B60R 21/232; B60R 2021/2173; B60R 2021/2175
See application file for complete search history.

(56) References Cited

U.S. PATENT DOCUMENTS

| | | | | | |
|---|---|---|---|---|---|
| 5,433,472 | A | * | 7/1995 | Green | B60R 21/2171 280/732 |
| 5,813,692 | A | * | 9/1998 | Faigle | B60R 21/2171 280/732 |
| 6,176,511 | B1 | * | 1/2001 | Adkisson | B60R 21/2171 280/736 |
| 6,241,278 | B1 | * | 6/2001 | Roote | B60R 21/213 280/730.2 |
| 6,616,176 | B2 | * | 9/2003 | Uchiyama | B60R 21/2171 280/732 |
| 6,976,700 | B2 | * | 12/2005 | McCann | B60R 21/2171 280/730.2 |
| 7,216,891 | B2 | * | 5/2007 | Biglino | B60R 21/232 24/458 |

(Continued)

FOREIGN PATENT DOCUMENTS

| | | |
|---|---|---|
| EP | 3293058 B1 | 5/2019 |
| JP | 2010195329 A | 9/2010 |

(Continued)

*Primary Examiner* — Laura Freedman
(74) *Attorney, Agent, or Firm* — Vichit Chea; Price Heneveld LLP

(57) ABSTRACT

An inflator bracket includes an elongate body having a first end and a second end. The elongate body defines an aperture proximate to the first end. A hook extends from the first end. An absorption feature has a proximal end coupled to the elongate body proximate to the aperture. The absorption feature defines a curve between the proximal end and a distal end. The distal end is spaced from the elongate body and the aperture.

18 Claims, 7 Drawing Sheets

(56) References Cited

U.S. PATENT DOCUMENTS

| | | | | |
|---|---|---|---|---|
| 7,370,884 | B2* | 5/2008 | Clark | B60R 21/26 |
| | | | | 280/736 |
| 7,703,797 | B2* | 4/2010 | Wright | B60R 21/2171 |
| | | | | 280/730.2 |
| 8,007,000 | B2 | 8/2011 | Gammill et al. | |
| 8,556,290 | B2* | 10/2013 | Fischer | B60R 21/262 |
| | | | | 280/741 |
| 8,684,399 | B2* | 4/2014 | Honda | B60R 21/263 |
| | | | | 280/728.2 |
| 10,632,953 | B2* | 4/2020 | Shigemura | B60R 21/206 |
| 2005/0212269 | A1 | 9/2005 | Schneider | |
| 2007/0273128 | A1 | 11/2007 | Cheal | |
| 2022/0332272 | A1* | 10/2022 | Wold | B60R 21/2171 |

FOREIGN PATENT DOCUMENTS

| | | |
|---|---|---|
| JP | 2010235043 A | 10/2010 |
| KR | 101010826 B1 | 1/2011 |

* cited by examiner

INFLATOR BRACKET ABSORPTION FEATURE

FIELD OF THE DISCLOSURE

The present disclosure generally relates to an inflator bracket. More specifically, the present disclosure relates to an inflator bracket for a side air curtain assembly.

BACKGROUND OF THE DISCLOSURE

Vehicles often have features for securing components in specific locations on the vehicle. The features may also retain select spacing and configurations between multiple components.

SUMMARY OF THE DISCLOSURE

According to at least one aspect of the present disclosure, a vehicle support assembly includes a vehicle body. A headliner is coupled to the vehicle body. A cavity is defined between the headliner and the vehicle body. An air curtain assembly is disposed within the cavity. The air curtain assembly includes an inflator. An inflator bracket is coupled to the inflator and positioned between the inflator and the vehicle body. The inflator bracket includes an elongate body and an absorption feature. The absorption feature is configured to adjust from an initial position to at least one of a first absorbing position and a second absorbing position in response to a predefined force acting on the inflator bracket.

According to another aspect of the present disclosure, an inflator assembly for an air curtain system includes an inflator in fluid communication with an air curtain. An inflator bracket is coupled to the inflator and configured to reduce movement of an inflator relative to a support structure. The inflator bracket includes an elongate body extending along a surface of the inflator. A cantilevered absorption feature has a proximal end coupled to the elongate body and a distal end spaced from the elongate body. The cantilevered absorption feature is configured to adjust to at least one of a bent position and a flattened position in response to a predefined force.

According to another aspect of the present disclosure, an inflator bracket includes an elongate body having a first end and a second end. The elongate body defines an aperture proximate to the first end. A hook extends from the first end. An absorption feature has a proximal end coupled to the elongate body proximate to the aperture. The absorption feature defines a curve between the proximal end and a distal end. The distal end is spaced from the elongate body and the aperture.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
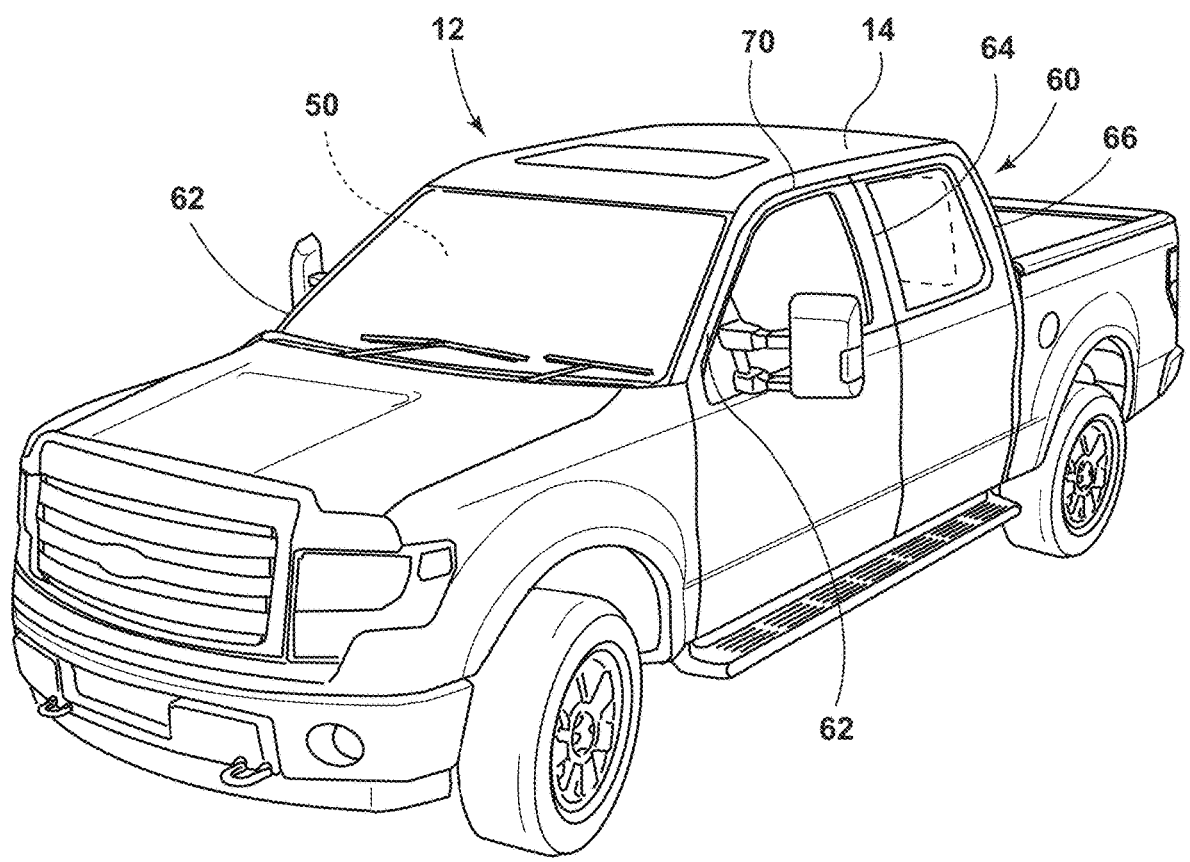
FIG. 1 is a side perspective view of a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

With reference to FIGS. 1-11, reference numeral 10 generally designates a support assembly for a vehicle 12, which includes a vehicle body 14. A headliner 16 is coupled to the vehicle body 14. A cavity 18 is defined between the headliner 16 and the vehicle body 14. An air curtain assembly 20 is disposed within the cavity 18. The air curtain assembly 20 includes an inflator 22 and an inflator bracket 24 coupled to the inflator 22 and positioned between the inflator 22 and the vehicle body 14. The inflator bracket 24 includes an elongate body 26 and an absorption feature 28. The absorption feature 28 is configured to adjust from an initial position 30 to at least one of a first absorbing position 32 to a second absorbing position 34 in response to a predefined or predetermined force acting on the inflator bracket 24.

Figure 2:
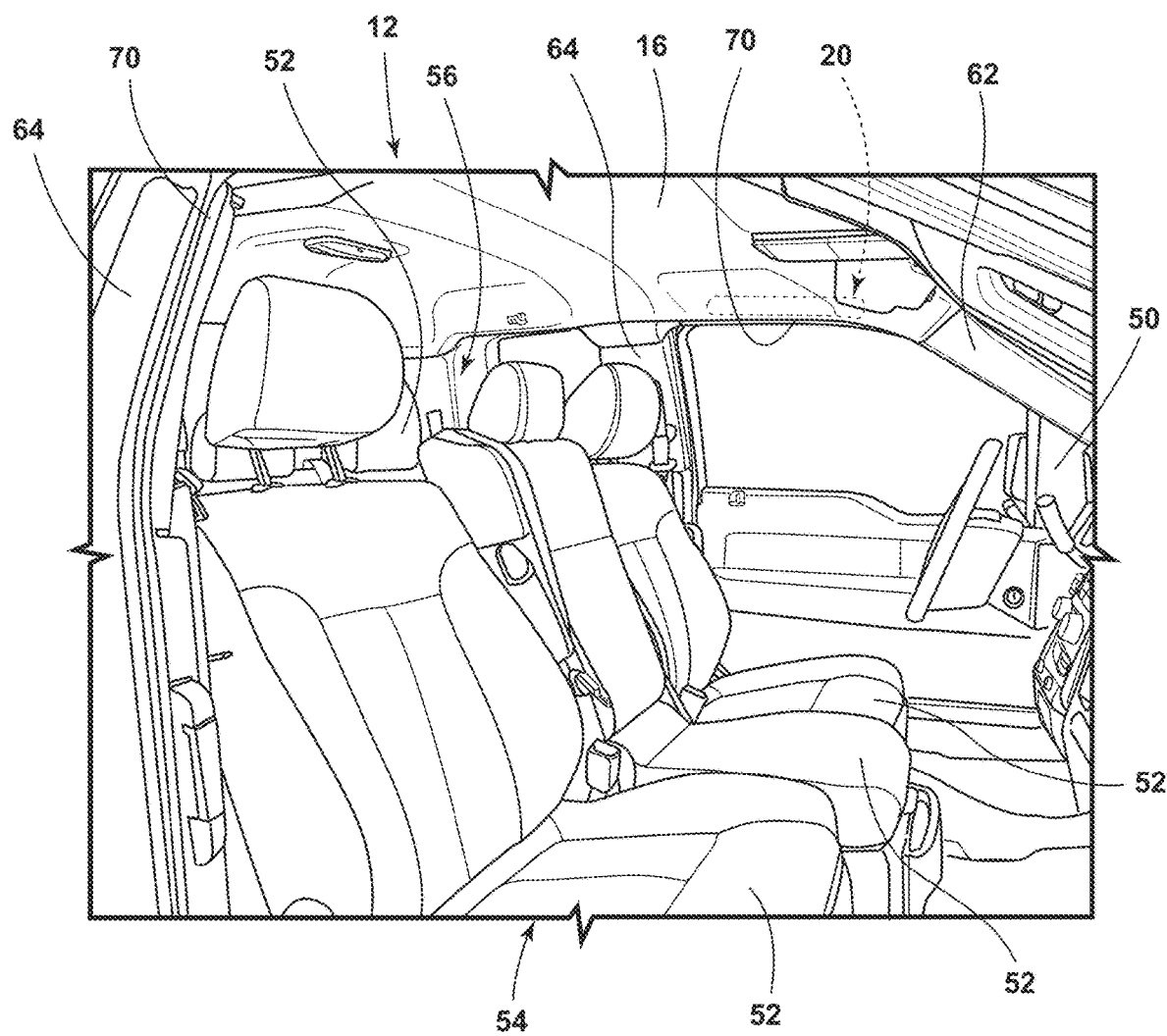
FIG. 2 is a partial side perspective view of a passenger cabin of a vehicle, according to the present disclosure.

Referring to FIGS. 1 and 2, the vehicle 12 includes a passenger cabin 50 generally defined by the vehicle body 14. Multiple seating assemblies 52 are positioned within the passenger cabin 50. In the illustrated example, the seating assemblies 52 are disposed in a first seating row 54 and a second seating row 56. It is contemplated that the vehicle 12 may not include the second seating row 56 or may include additional seating rows without departing the teachings herein.

The vehicle body 14 includes vertical supports, generally referred to as pillars 60. In the illustrated example, the pillars 60 include an A-pillar 62, a B-pillar 64, and a C-pillar 66. The first seating row 54 is generally disposed between the A-pillar 62 and the B-pillar 64, while the second seating row 56 is generally disposed between the B-pillar 64 and the C-pillar 66. Additional or fewer pillars 60 may be included in the vehicle 12 without departing from the teachings herein.

The vehicle 12 is illustrated as a truck; however, the vehicle 12 may be a sedan, a sport utility vehicle, a crossover, and other wheeled motor vehicles 12, or other types of vehicle 12. The vehicle 12 may be a manually operated vehicle 12 (e.g., operated with a human driver), a fully autonomous vehicle 12 (e.g., operated without a human driver), or a partially autonomous vehicle 12 (e.g., operated with or without a human driver). Additionally, the vehicle 12 may be utilized for personal and/or commercial purposes, such as, for ride-providing services (e.g., chauffeuring), transporting, and/or ride-sharing services.

Figure 3:
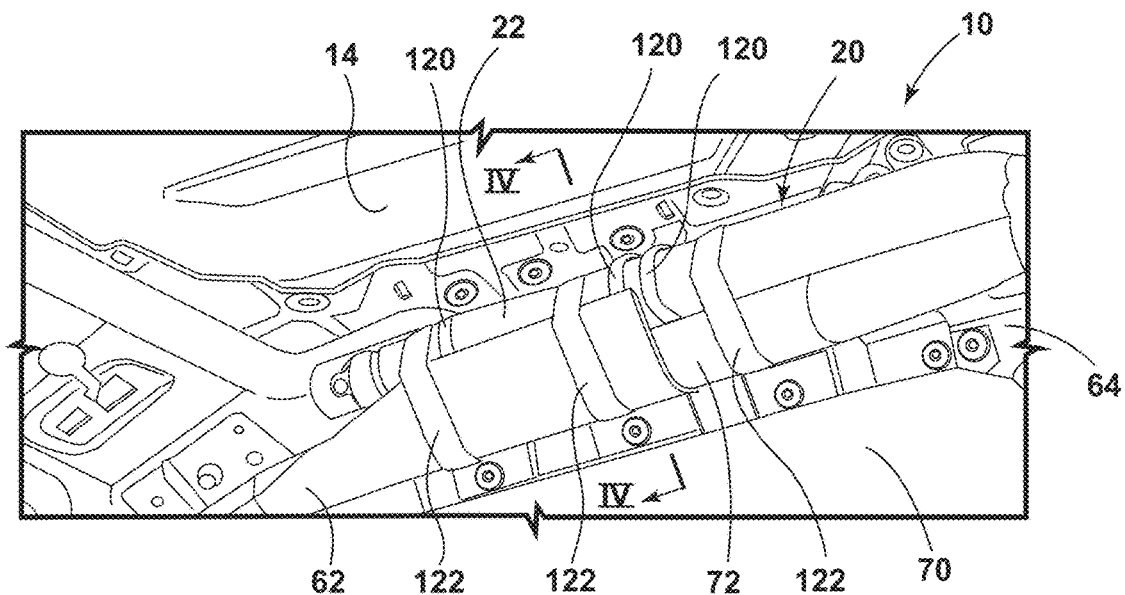
FIG. 3 is a bottom perspective view of a side air curtain assembly, according to the present disclosure.
Figure 4:
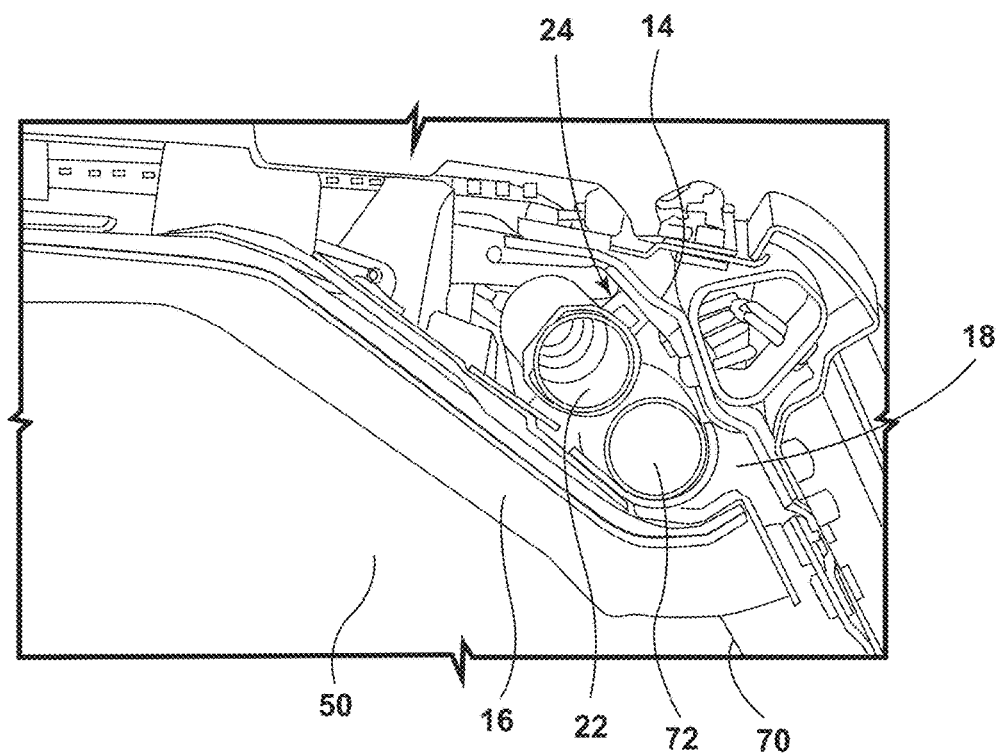
FIG. 4 is a cross-sectional view of the side air curtain assembly of FIG. 3 taken along line IV-IV, according to the present disclosure.

Referring still to FIG. 2, as well as FIGS. 3 and 4, the headliner 16 is disposed within the passenger cabin 50. The headliner 16 extends along at least a portion of the vehicle body 14. In this way, the headliner 16 generally conceals the vehicle body 14, as well as components disposed between the headliner 16 and the vehicle body 14. The air curtain assembly 20 is generally positioned within the cavity 18 defined between the headliner 16 and the vehicle body 14. The vehicle 12 may include multiple air curtain assemblies 20, each having a substantially similar configuration. For example, the vehicle 12 may have side air curtain assemblies 20 between the A-pillar 62 and the B-pillar 64 proximate to each seating assembly 52 in the first seating row 54. Additionally or alternatively, the vehicle 12 may include air curtain assemblies 20 between the B-pillar 64 and the C-pillar 66 on opposing sides of the vehicle 12 adjacent to the second seating row 56.

In the example illustrated in FIG. 3, the air curtain assembly 20 extends along the vehicle body 14 between the A-pillar 62 and the B-pillar 64 over a door space 70. The air curtain assembly 20 is disposed adjacent to the seating assembly 52 in the first seating row 54 on a driver side of the vehicle 12. The air curtain assembly 20 extends in a fore-aft direction, extending adjacent to the vehicle body 14 over the door space 70.

The air curtain assembly 20 generally includes the inflator 22 and an air curtain 72. The inflator 22 and the air curtain 72 are generally in fluid communication with one another. When the inflator 22 is activated, the air curtain 72 may generally be deployed by the inflator 22. The inflator 22 is generally disposed within the cavity 18 between the headliner 16 and the vehicle body 14. Typically, a sensor is configured to sense the predefined force, which results in the activation of the inflator 22.

The inflator bracket 24 is disposed between the inflator 22 and the vehicle body 14. The inflator bracket 24 may reduce or eliminate squeak-and-rattle caused by the air curtain assembly 20. The inflator bracket 24 maintains pressure between the inflator 22, the inflator bracket 24, and the vehicle body 14 to prevent rattle. Additionally, the inflator bracket 24 may generally maintain a space between the inflator 22 and the vehicle body 14.

The absorption feature 28 prevents free movement of the inflator bracket 24 relative to the vehicle body 14 (e.g., a support structure). Without the absorption feature 28, the inflator bracket 24 could move a select distance to reach the vehicle body 14. The absorption feature 28 generally has a height relative to the elongate body 26 that is substantially similar to the select distance to reduce or eliminate movement of the inflator bracket 24. Further, the inflator bracket 24 may absorb energy without substantially impinging space in the passenger cabin 50.

Figure 5:
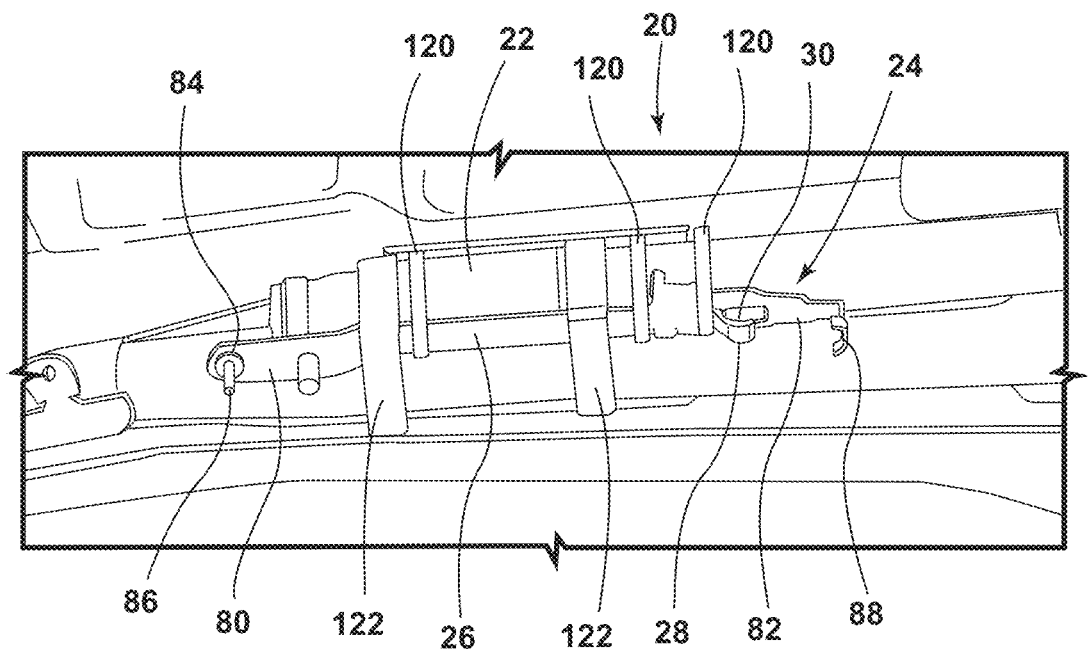
FIG. 5 is a side perspective view of an inflator bracket coupled to an inflator, according to the present disclosure.

Referring to FIG. 5, the inflator bracket 24 extends along an outer surface of the inflator 22 and is configured to engage the vehicle body 14 to maintain the spacing between the air curtain assembly 20 and the vehicle body 14. The inflator bracket 24 has the elongate body 26 that extends in the fore-aft direction along the inflator 22. A first end 80 of the elongate body 26 is disposed in a vehicle-forward location, while a second end 82 is disposed in a vehicle-rearward location. The first end 80 defines an aperture 84 for receiving a fastener 86. In certain aspects, the fastener 86 is a mounting bolt that extends through the aperture 84 and secures the inflator bracket 24 to the vehicle body 14.

A hook 88 extends from the second end 82 of the elongate body 26. The hook 88 generally extends substantially perpendicular to the elongate body 26. The hook 88 extends outward from the elongate body 26 and couples with the vehicle body 14. The hook 88 is configured to assist in retaining the space between the inflator bracket 24 and the vehicle body 14.

Figure 6:
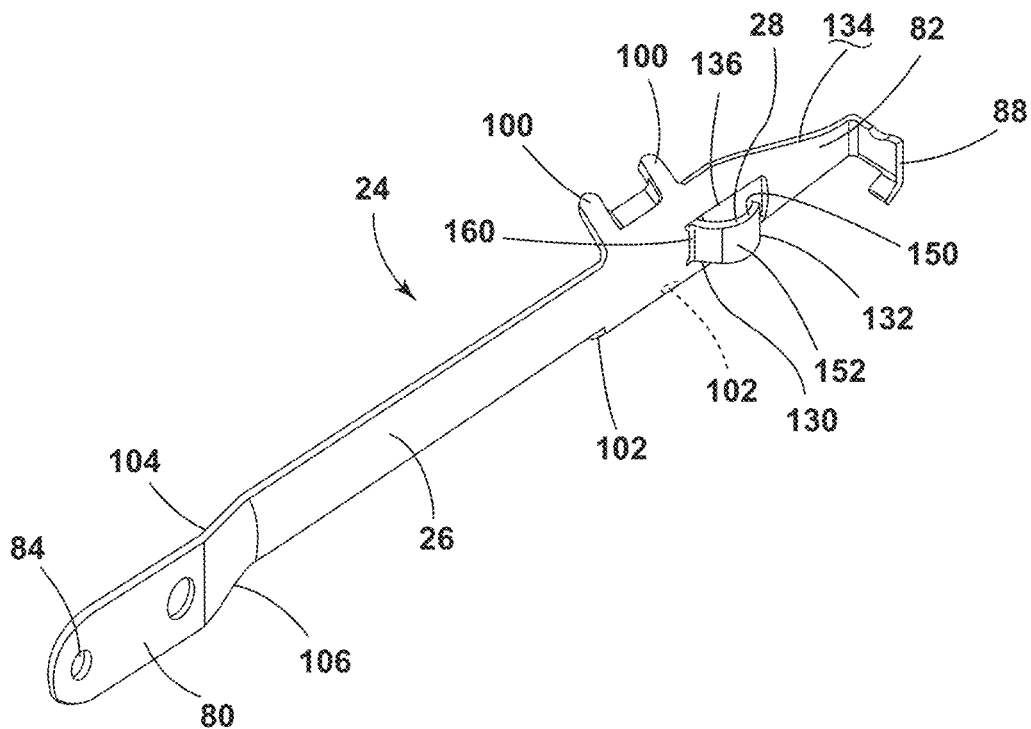
FIG. 6 is a side perspective view of an inflator bracket, according to the present disclosure.

Referring still to FIG. 5, as well as FIG. 6, the inflator bracket 24 includes side arms 100, 102 extending in opposing directions outward from lateral sides of the elongate body 26. In the illustrated example, two side arms 100 extend in a first direction and two side arms 102 extend in a second opposing direction. The side arms 100, 102 extend from lateral side edges proximate to the second end 82 of the elongate body 26. The side arms 100, 102 generally curve to extend along the outer surface and partially around the inflator 22. Additionally or alternatively, a width of the elongate body 26 may be greater between the side arms 100, 102 relative to a remainder of the elongate body 26 to provide additional support and engagement between the inflator bracket 24 and the inflator 22.

The absorption feature 28 may be disposed proximate to the hook 88 and proximate to the side arms 100, 102. The width of the elongate body 26 may be greater proximate to the side arms 100, 102. Additionally, the width of the elongate body 26 may decrease between the absorption feature 28 and the hook 88.

The first end 80 may be offset from the remainder of the elongate body 26. Accordingly, the elongate body 26 has an offset portion 104 at the first end 80, which is offset from the remainder of the elongate body 26 via a sloped portion 106. The offset portion 104 may provide additional space for the inflator 22 or other components of the air curtain assembly 20. The shape of the inflator 22 may change proximate to the first end 80 of the inflator bracket 24, and the inflator bracket 24 may include the offset portion 104 to continue to extend along the surface of the inflator 22.

The inflator bracket 24 may be coupled with the inflator 22 via first support features 120. The first support features 120 are generally bands that extend around the inflator 22 and the inflator bracket 24. In the illustrated example, the air curtain assembly 20 includes two support features 120 extending proximate to the side arms 100, 102 and a third support feature 120 extending proximate to the sloped portion 106. The first support features 120 generally operate to couple the inflator bracket 24 to the inflator 22 and retain the position of the inflator bracket 24 relative to the inflator 22.

Additionally or alternatively, the air curtain assembly 20 includes additional or second support features 122 that extend around the inflator bracket 24, the inflator 22, and the air curtain 72. The additional support features 122 are configured as bands that couple the various components of air curtain assembly 20 together.

Figure 7:
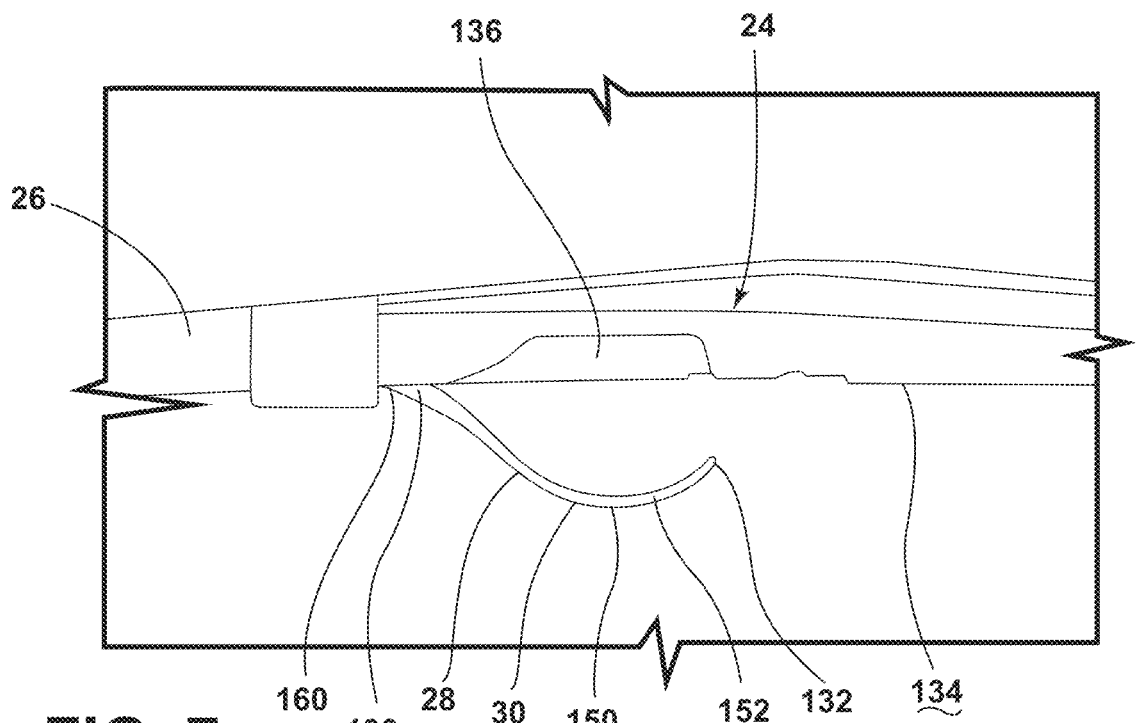
FIG. 7 is a side plan view of an inflator bracket with an absorption feature, according to the present disclosure.

Referring still to FIG. 6, as well as to FIG. 7, the inflator bracket 24 includes the absorption feature 28 configured to absorb energy in two stages when the predefined force acts on the inflator bracket 24. The absorption feature 28 includes a proximal end 130 that is coupled to the elongate body 26 and a distal end 132 spaced from an outer surface 134 of the elongate body 26. The inflator bracket 24 defines an aperture 136 in the second end 82 of the elongate body 26. The proximal end 130 is coupled to the elongate body 26 adjacent to the aperture 136. The absorption feature 28 generally arcs and extends over the aperture 136 toward the hook 88 on the opposing side of the aperture 136.

The absorption feature 28 defines a radius or curve 150 in a center 152 between the proximal and distal ends 130, 132. The curve 150 is convex relative to the outer surface 134 of the elongate body 26 with an apex of the curve 150 disposed proximate to the vehicle body 14. An arc of the curve 150 defines a first radius when the absorption feature 28 is in the initial position 30. In this way, the absorption feature 28 extends away from the outer surface 134 of the elongate body 26, defines the curve 150 over the aperture 136, and extends toward the outer surface 134, while remaining spaced from the outer surface 134 at the distal end 132. The absorption feature 28 may define a generally parabolic shape, a generally sinusoidal shape, or any other practicable shape that defines at least one curve 150.

Figure 8:
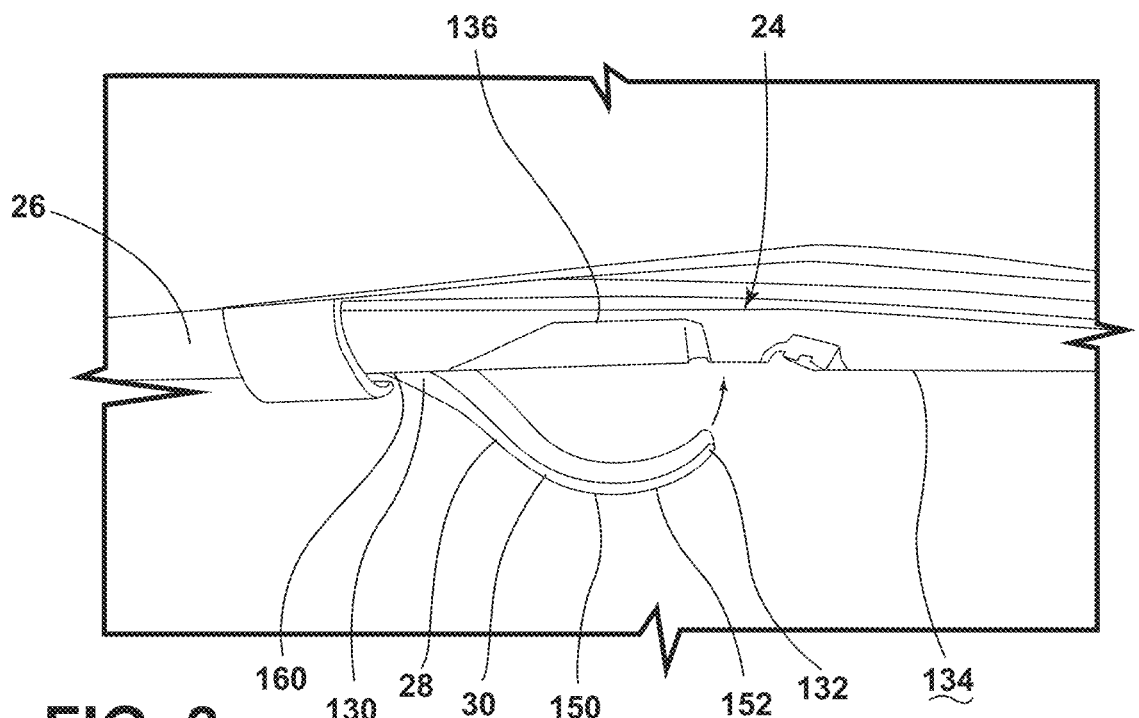
FIG. 8 is a side plan view of an absorption feature in an initial position, according to the present disclosure.
Figure 9:
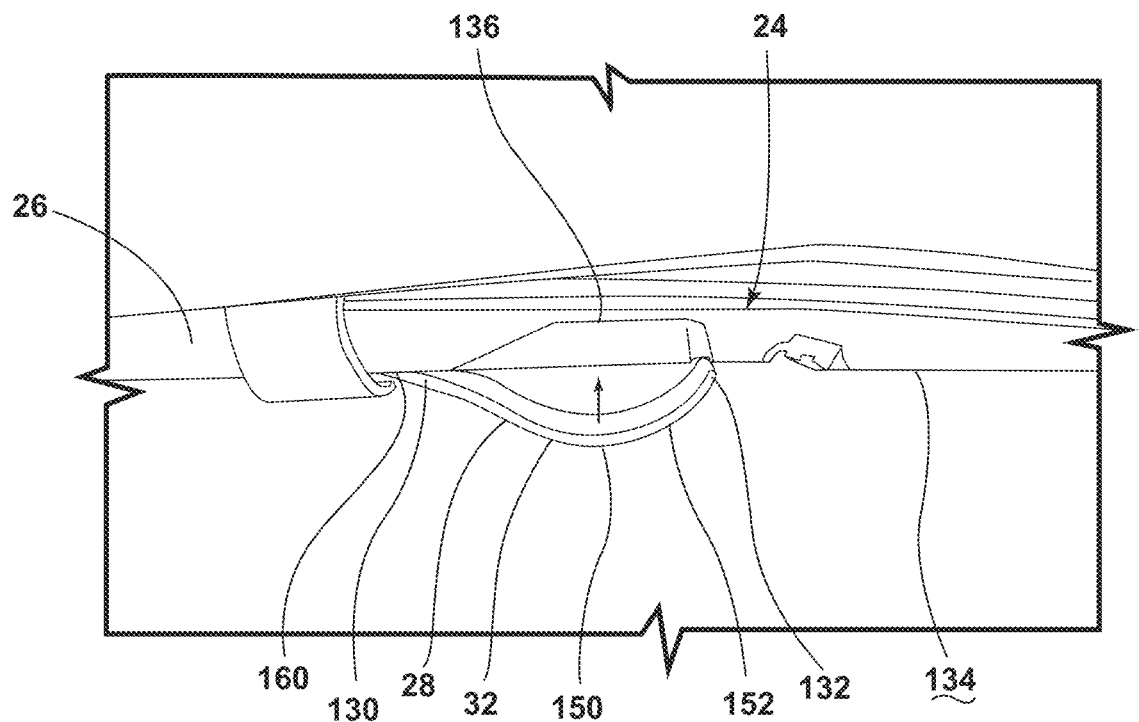
FIG. 9 is a side plan view of an absorption feature in a first absorbing position, according to the present disclosure.
Figure 10:
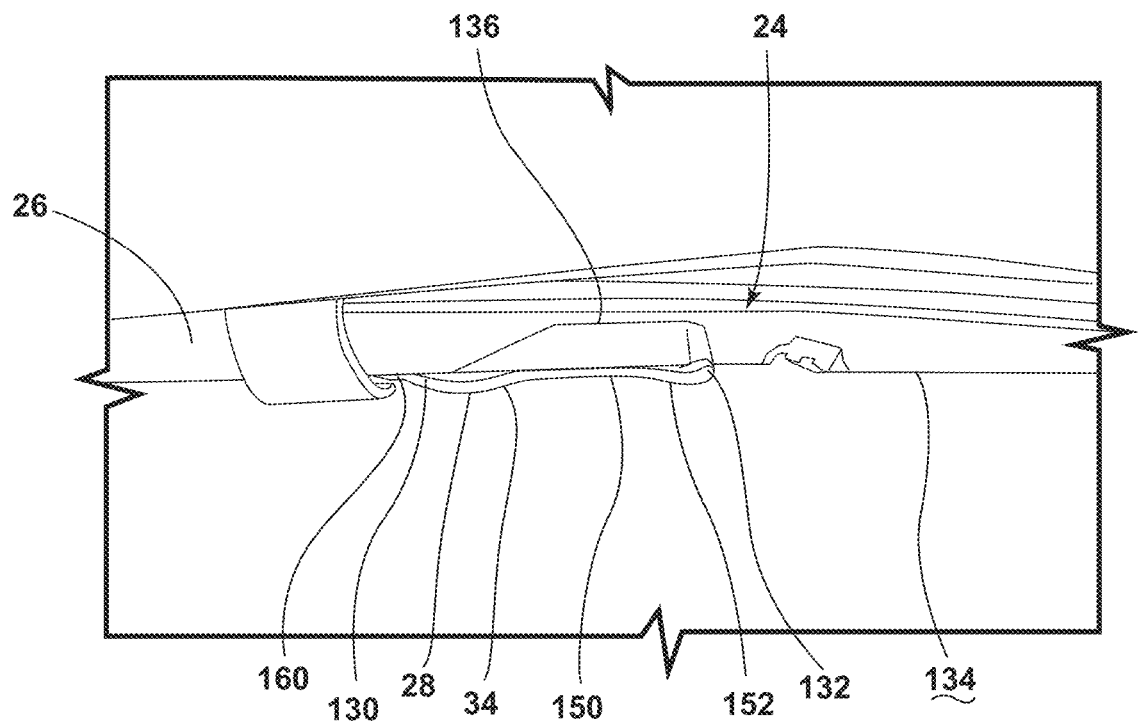
FIG. 10 is a side plan view of an absorption feature in a second absorbing position, according to the present disclosure.

Referring to FIGS. 8-10, the absorption feature 28 is configured to bend and/or deform in response to the predefined force acting on the inflator bracket 24. According to various aspects, the absorption feature 28 is configured to bend to provide a first stage of energy absorption and deform to provide a second stage of energy absorption. In FIG. 8, the absorption feature 28 is illustrated in the initial position 30. In the initial position 30, the distal end 132 is spaced from the outer surface 134 of the elongate body 26. Additionally, when in the initial position 30, the absorption feature 28 defines the curve 150. The curve 150 is the greatest or sharpest curve 150 of the absorption feature 28. A first space is defined between the distal end and the outer surface 134, and a second greater space is defined between the center 152 and the outer surface 134.

In FIG. 9, the absorption feature 28 is illustrated in the first absorbing position 32, which is a bent position. The proximal end 130 of the absorption feature 28 is coupled to the elongate body 26 at a junction 160. The absorption feature 28 is generally a cantilevered feature that extends from the junction 160. In response to the predefined force, the absorption feature 28 is configured to bend at the junction 160. When bending at the junction 160, the distal end 132 of the absorption feature 28 is moved toward the outer surface 134 of the elongate body 26. The first space between the distal end 132 and the elongate body 26 is reduced and/or eliminated. The absorption feature 28 may bend until the distal end 132 contacts the outer surface 134 of the elongate body 26. It is also contemplated that based on the shape of the curve 150, the distal end 132 may be moved into or adjacent to the aperture 136. The bending from the initial position 30 to the first absorbing position 32 provides the first stage of absorption for the inflator bracket 24 in response to the predefined force.

In FIG. 10, the inflator bracket 24 is illustrated in the second absorbing position 34. The absorption feature 28 moves from the first absorbing position 32 to the second absorbing position 34, which is a flattened position. Accordingly, the absorption feature 28 is configured to deform when the distal end 132 is disposed adjacent to or abutting the elongate body 26. The curve 150 is flattened or reduced to a shallower curve 150 in response to the predefined force. The center 152 of the absorption feature 28 is moved toward the aperture 136 defined by the elongate body 26. The second space defined between the center 152 and the elongate body 26 is reduced and/or eliminated. The absorption feature 28 is flattened to a shallower curved feature or a flattened feature, against or adjacent to the elongate body 26. The arc of the curve 150 adjusts from the first radius to a second, lesser radius, which is shallower than the first radius as the absorption feature 28 moves to the second absorbing position 34. The flattening of the absorption feature 28 between the first absorbing position 32 and the second absorbing position 34 provides the second stage of absorption. Accordingly, in the second absorbing position 34, both the distal end 132 and the center 152 are disposed proximate to the elongate body 26.

Figure 11:
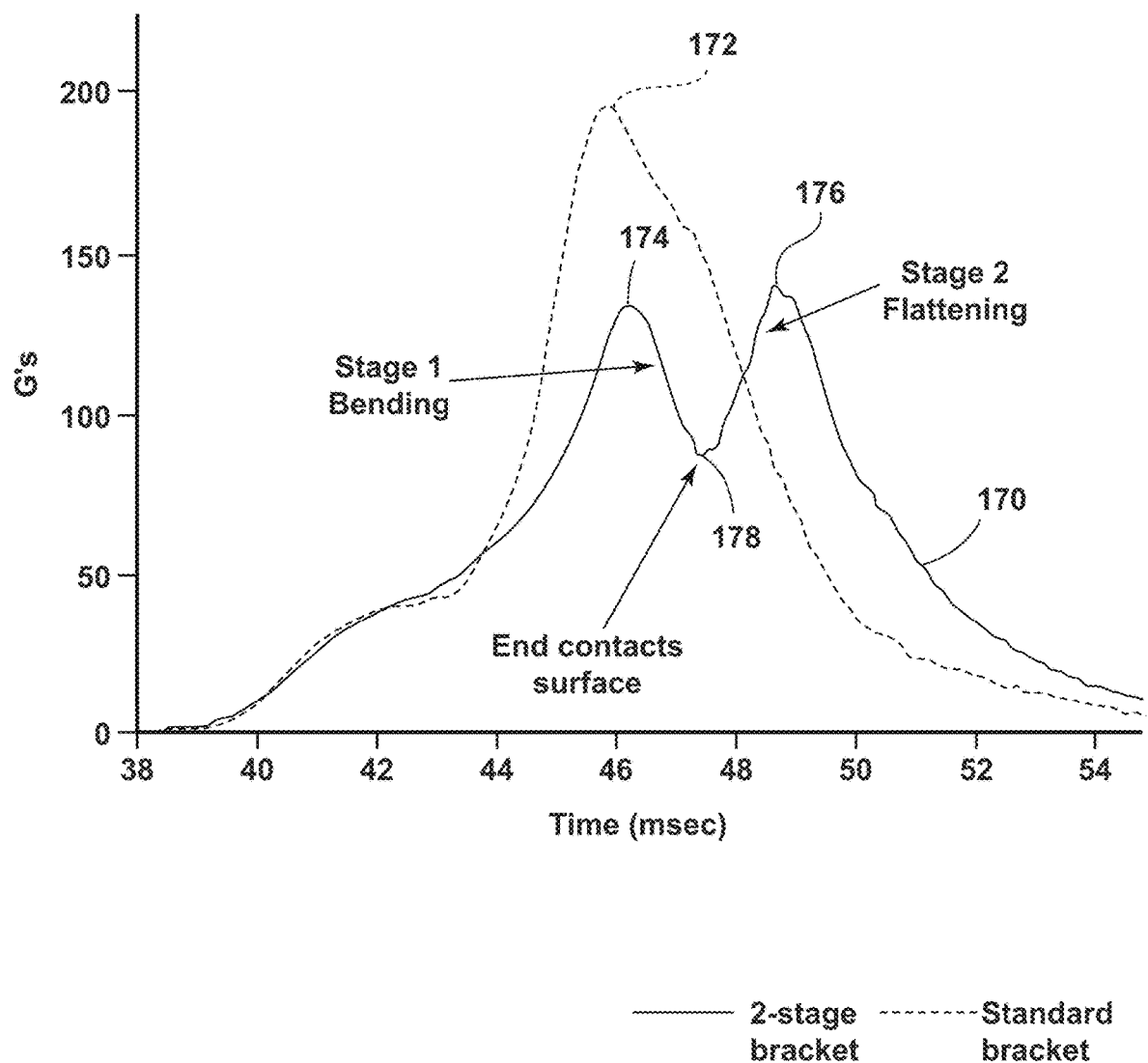
FIG. 11 is a graphical representation of deceleration from an inflator bracket with an absorption feature compared to a standard bracket without the absorption feature, according to the present disclosure.

Referring to FIG. 11, a graph of deceleration relative to time illustrates the energy absorption provided by the inflator bracket 24, illustrated by a solid line 170, compared to a standard bracket, illustrated by a dashed line 172. In the illustrated example, the standard bracket has a single peak of deceleration. In comparison, the inflator bracket 24 has two peaks 174, 176 of deceleration. The first peek 174 occurs during the first stage of absorption, which is a result of the movement of the absorption feature 28 adjusting from the initial position 30 to the first absorbing position 32.

The deceleration increases as the absorption feature 28 bends at the junction 160. The rate of deceleration then decreases to a vertex 178. The vertex 178 coincides with the distal end 132 engaging the outer surface 134 of the elongate body 26.

The second peak 176 of deceleration coincides with the second stage of energy absorption provided by the inflator bracket 24. In the illustrated example, the deceleration at the second peak 176 is greater than the deceleration at the first peak 174. The second peak 176 is caused by the absorption feature 28 moving from the first absorbing position 32 to the second absorbing position 34. Accordingly, as the center 152 flattens, the rate of declaration increases and then decreases.

The inflator bracket 24 disclosed herein produces lower rates of deceleration compared to the standard bracket. Further, the inflator bracket 24 provides for bi-modal deceleration with the two peaks 174, 176, separated by the vertex 178, to provide two stages of deceleration. The bending and flattening of the absorption feature 28 provide the two stages of energy absorption in response to the predefined force.

Referring to FIGS. 1-11, the inflator bracket 24 is disposed between the inflator 22 and the vehicle body 14 to maintain the spacing and configuration between the air curtain assembly 20 and the vehicle body 14. When the predefined force acts on the headliner 16, the air curtain assembly 20 is generally activated. Additionally, the predefined force may adjust the position of the inflator bracket 24 relative to the vehicle body 14. The change in position due to the predefined force may cause the absorption feature 28 to adjust from the initial position 30 to the first absorbing position 32 and/or the second absorbing position 34. The absorption feature 28 is configured to bend until the distal end 132 contacts the outer surface 134 and then flatten as the center 152 moves toward the elongate body 26. The two position adjustments of the absorption feature 28 provide two stages of energy absorption for the air curtain assembly 20.

Use of the present device may provide for a variety of advantages. For example, the inflator bracket 24 may maintain the space between the air curtain assembly 20 and the vehicle body 14. Additionally, the inflator bracket 24 may operate as an anti-rattle feature to reduce or eliminate the shake-and-rattle of the air curtain assembly 20. Further, the inflator bracket 24 is configured to provide two stages of energy absorption. Moreover, the inflator bracket 24 includes the absorption feature 28 configured to bend from the initial position 30 to the first absorbing position 32 as the distal end 132 moves toward the outer surface 134 to provide the first stage of energy absorption. Additionally, the center 152 is configured to flatten or to deform to a shallower curve 150 during the second stage of absorption as the absorption feature 28 moves to the second absorbing position 34. Also, the center 152 is configured to compress or deform toward the aperture 136 defined by the elongate body 26. Moreover, the inflator bracket 24 provides an efficient package for energy absorption without substantially impinging the space in the passenger cabin 50. Further, the use of the inflator bracket 24 may increase efficiency as additional components, such as a carrier bracket, may be removed from the air curtain assembly 20. Additional benefits or advantages may be realized and/or achieved.

According to various examples, a vehicle support assembly includes a vehicle body. A headliner is coupled to the vehicle body. A cavity is defined between the headliner and the vehicle body. An air curtain assembly is disposed within the cavity. The air curtain assembly includes an inflator. An inflator bracket is coupled to the inflator and positioned between the inflator and the vehicle body. The inflator bracket includes an elongate body and an absorption feature. The absorption feature is configured to adjust from an initial position to at least one of a first absorbing position and a second absorbing position in response to a predefined force acting on the inflator bracket. Embodiments of the present disclosure may include one or a combination of the following features:

- the inflator bracket includes an end having a hook configured to engage the vehicle body;
- the absorption feature is disposed proximate to the hook;
- the absorption feature includes a proximal end coupled to the elongate body and a distal end;
- the distal end is spaced from an outer surface of the elongate body when in the initial position;
- the absorption feature is disposed proximate to a vehicle-rearward end of the inflator bracket;
- the absorption feature is curved having an apex disposed proximate the vehicle body;
- the distal end is disposed proximate to the elongate body when the absorption feature is in the first absorbing position; and/or
- the distal end is disposed proximate to the elongate body and a curve of the absorption feature is reduced when the absorption feature is in the second absorbing position.

According to various examples, an inflator assembly for an air curtain system includes an inflator in fluid communication with an air curtain. An inflator bracket is coupled to the inflator and configured to reduce movement of an inflator relative to a support structure. The inflator bracket includes an elongate body extending along a surface of the inflator. A cantilevered absorption feature has a proximal end coupled to the elongate body and a distal end spaced from the elongate body. The cantilevered absorption feature is configured to adjust to at least one of a bent position and a flattened position in response to a predefined force. Embodiments of the present disclosure may include one or a combination of the following features:

- the distal end is disposed proximate to the elongate body when the cantilevered absorption feature is in the bent position;
- the cantilevered absorption feature defines an arc having a first radius between the proximal end and the distal end;
- the arc is flattened to a second, lesser radius when the inflator bracket is in the flattened position;
- the elongate body defines an aperture adjacent to the proximal end of the cantilevered absorption feature;
- the inflator bracket includes side arms that extend in opposing directions from lateral sides of the elongate body; and/or wherein the distal end of the cantilevered absorption feature is coupled to the elongate body proximate to the side arms.

According to various examples, an inflator bracket includes an elongate body having a first end and a second end. The elongate body defines an aperture proximate to the first end. A hook extends from the first end. An absorption feature has a proximal end coupled to the elongate body proximate to the aperture. The absorption feature defines a curve between the proximal end and a distal end. The distal end is spaced from the elongate body and the aperture. Embodiments of the present disclosure may include one or a combination of the following features:

the absorption feature is configured to bend proximate to the proximal end to reduce a space defined between the distal end and the elongate body in response to a predefined force;

the curve is configured to flatten in response to a predefined force;

the inflator bracket includes curved side arms extending from the first end and configured to engage an inflator;

the elongate body narrows between the aperture and the hook; and/or the second end is offset from the first end by a sloped section.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure.

Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle support assembly, comprising:
   a vehicle body;
   a headliner coupled to the vehicle body, wherein a cavity is defined between the headliner and the vehicle body; and
   an air curtain assembly disposed within the cavity, wherein the air curtain assembly includes:
      an inflator; and
      an inflator bracket coupled to the inflator and positioned between the inflator and the vehicle body, wherein the inflator bracket includes an elongate body and an absorption feature, wherein the absorption feature is spaced from the inflator in an initial position and configured to bend toward the inflator from the initial position to a first absorbing position where a distal end abuts the elongate body and is then configured to flatten from the first absorbing position to a second absorbing position in response to a predefined force acting on the inflator bracket to absorb energy in two stages.

2. The vehicle support assembly of claim 1, wherein the inflator bracket includes an end having a hook configured to engage the vehicle body.

3. The vehicle support assembly of claim 2, wherein the absorption feature is disposed proximate to the hook.

4. The vehicle support assembly of claim 1, wherein the absorption feature is disposed proximate to a vehicle-rearward end of the inflator bracket.

5. The vehicle support assembly of claim 1, wherein the absorption feature is curved having an apex disposed proximate the vehicle body.

6. The vehicle support assembly of claim 1, wherein the absorption feature includes a proximal end coupled to the elongate body and the distal end, wherein the distal end is spaced from an outer surface of the elongate body when in the initial position.

7. The vehicle support assembly of claim 6, wherein a curve of the absorption feature is reduced when the absorption feature is in the second absorbing position compared to the curve in the initial position and the curve in the first absorbing position.

8. An inflator assembly for an air curtain system, comprising:
   an inflator in fluid communication with an air curtain; and
   an inflator bracket coupled to the inflator and configured to reduce movement of the inflator relative to a support structure, wherein the inflator bracket includes:
      an elongate body extending along a surface of the inflator; and
      a cantilevered absorption feature having a proximal end coupled to the elongate body and a distal end spaced from the elongate body when in an initial position, wherein the cantilevered absorption feature is configured to pivot from the initial position to a bent position where the distal end moves towards the elongate body, and wherein the cantilevered absorption feature is then configured to compress from the bent position to a flattened position where a center of the cantilevered absorption feature moves towards an aperture defined by the elongate body in response to a predefined force.

9. The inflator assembly of claim 8, wherein the distal end abuts the elongate body when the cantilevered absorption feature is in the bent position.

10. The inflator assembly of claim 8, wherein the cantilevered absorption feature defines an arc in the center thereof having a first radius between the proximal end and the distal end when in the initial position.

11. The inflator assembly of claim 10, wherein the arc is flattened to a second, lesser radius when the inflator bracket is in the flattened position.

12. The inflator assembly of claim 8, wherein the elongate body defines the aperture adjacent to the proximal end of the cantilevered absorption feature.

13. The inflator assembly of claim 8, wherein the inflator bracket includes side arms that extend in opposing directions from lateral sides of the elongate body, and wherein the proximal end of the cantilevered absorption feature is coupled to the elongate body proximate to the side arms.

14. An inflator bracket, comprising:
an elongate body having a first end and a second end, wherein the elongate body defines an aperture proximate to the first end;
a hook extending from the first end; and
an absorption feature having a proximal end coupled to the elongate body proximate to the aperture, wherein the absorption feature defines a curve between the proximal end and a distal end, and wherein the distal end is spaced from the elongate body and the aperture in an initial position, wherein the absorption feature is configured to move from the initial position to a bent position where the distal end is disposed adjacent to the elongate body and then compresses to a flattened position where the curve compresses to be adjacent to the aperture in response to a predefined force acting on the inflator bracket.

15. The inflator bracket of claim 14, wherein the curve is configured to flatten to a lesser radius in response to the predefined force.

16. The inflator bracket of claim 14, wherein the inflator bracket includes curved side arms extending from the first end and configured to engage an inflator.

17. The inflator bracket of claim 14, wherein the elongate body narrows between the aperture and the hook.

18. The inflator bracket of claim 14, wherein the second end is offset from the first end by a sloped section.

* * * * *